(12) United States Patent
Liu et al.

(10) Patent No.: US 12,408,253 B2
(45) Date of Patent: Sep. 2, 2025

(54) VARIABLE FOCUS FLASHLIGHT MODULE (71) Applicant: GUANGZHOU LUXVISIONS INNOVATION TECHNOLOGY LIMITED, Guangzhou (CN)

(72) Inventors: Yi-Wei Liu, Guangzhou (CN); Tsung-Kai Chang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 18/760,025

(22) Filed: Jul. 1, 2024

(65) Prior Publication Data
US 2025/0168952 A1 May 22, 2025

Related U.S. Application Data (60) Provisional application No. 63/600,725, filed on Nov. 19, 2023.

(30) Foreign Application Priority Data

Apr. 10, 2024  (CN) .......................... 202410428131.3

(51) Int. Cl.
*G02B 9/12* (2006.01)
*F21V 5/00* (2018.01)
(Continued)

(52) U.S. Cl.
CPC ........... *H05B 47/155* (2020.01); *F21V 5/004* (2013.01); *F21V 5/006* (2013.01); *F21V 5/008* (2013.01); *F21V 5/045* (2013.01); *G02B 9/12* (2013.01); *F21Y 2105/16* (2016.08); *F21Y 2115/10* (2016.08)

(58) Field of Classification Search
CPC ....... H05B 47/155; F21V 5/004; F21V 5/006; F21V 5/008; F21V 5/045; G02B 9/12; F21Y 2105/16; F21Y 2115/10
See application file for complete search history.

(56) References Cited

U.S. PATENT DOCUMENTS 4,919,524 A * 4/1990 Shinohara ............ G02B 15/143
359/740
5,452,134 A * 9/1995 Sato ..................... G02B 15/142
359/713
(Continued)

FOREIGN PATENT DOCUMENTS

CN 113795923 A * 12/2021 .......... H01L 27/156
JP 2017125978 A * 7/2017
KR 2019046272 A * 5/2019 .......... A61B 5/0077

*Primary Examiner* — Zheng Song
(74) *Attorney, Agent, or Firm* — JCIPRNET (57) ABSTRACT A variable focus flashlight module including a first lens, a second lens, a third lens, and a light source module sequentially from a magnified side to a minified side along an optical axis of the variable focus flashlight module is provided. The first lens has a negative refracting power. The second lens has a positive refracting power. The third lens has a positive refracting power. The light source module includes multiple light emitting elements arranged in an array. A total length of the variable focus flashlight module is a constant value, and a ratio of a focal length of the second lens to a focal length of the third lens falls within a range of 1.78 to 3.02.

5 Claims, 6 Drawing Sheets (51) Int. Cl.
  *F21V 5/04*      (2006.01)
  *H05B 47/155*    (2020.01)
  *F21Y 105/16*    (2016.01)
  *F21Y 115/10*    (2016.01)

(56) References Cited

U.S. PATENT DOCUMENTS

| | | | |
|---|---|---|---|
| 6,773,139 B2 * | 8/2004 | Sommers | F21V 5/006 |
| | | | 362/240 |
| 2015/0015967 A1 * | 1/2015 | Amano | G02B 15/177 |
| | | | 359/680 |
| 2017/0248769 A1 * | 8/2017 | Stamenov | G02B 27/027 |
| 2018/0188641 A1 * | 7/2018 | Chen | H01L 27/092 |
| 2019/0154986 A1 * | 5/2019 | Hagiwara | G02B 9/60 |
| 2019/0331879 A1 * | 10/2019 | Stamenov | G02B 27/0172 |
| 2022/0396203 A1 * | 12/2022 | Park | G02B 3/14 |
| 2023/0296219 A1 * | 9/2023 | Lu | F21S 41/663 |
| | | | 362/520 |

* cited by examiner

VARIABLE FOCUS FLASHLIGHT MODULE

CROSS-REFERENCE TO RELATED APPLICATION

This application claims the priority benefit of U.S. provisional application Ser. No. 63/600,725, filed on Nov. 19, 2023, and China application serial no. 202410428131.3, filed on Apr. 10, 2024. The entirety of each of the above-mentioned patent applications is hereby incorporated by reference herein and made a part of this specification.

BACKGROUND

Technical Field

The disclosure relates to an optical device, and in particular to a variable focus flashlight module.

Description of Related Art

As portable electronic devices become more popular, the requirements for the specifications of a flashlight, which is one of the components, become higher. For flashlights of portable electronic devices, how to provide the most optimized light-emitting effect according to the usage environment is an issue to be solved.

SUMMARY

The disclosure provides a variable focus flashlight module, which provides an arrayed illumination area, an adjustable lighting effect, and an adjustable illumination range.

According to an embodiment of the disclosure, a variable focus flashlight module is provided. The variable focus flashlight module includes a first lens, a second lens, a third lens, and a light source module sequentially from a magnified side to a minified side along an optical axis of the variable focus flashlight module. The first lens has a negative refracting power. The second lens has a positive refracting power. The third lens has a positive refracting power. The light source module includes multiple light emitting elements arranged in an array. A total length of the variable focus flashlight module is a constant value, and a ratio of a focal length of the second lens to a focal length of the third lens falls within a range of 1.78 to 3.02.

Based on the above, the variable focus flashlight module provided by the embodiment of the disclosure uses the light emitting elements to generate illumination areas in an array. A relative illumination intensity and a color temperature of different illumination areas are adjustable. In addition, the lenses are used to achieve the function of adjustable illumination range.

To make the aforementioned more comprehensible, several embodiments accompanied with drawings are described in detail as follows.

DESCRIPTION OF THE EMBODIMENTS

Figure 1A:
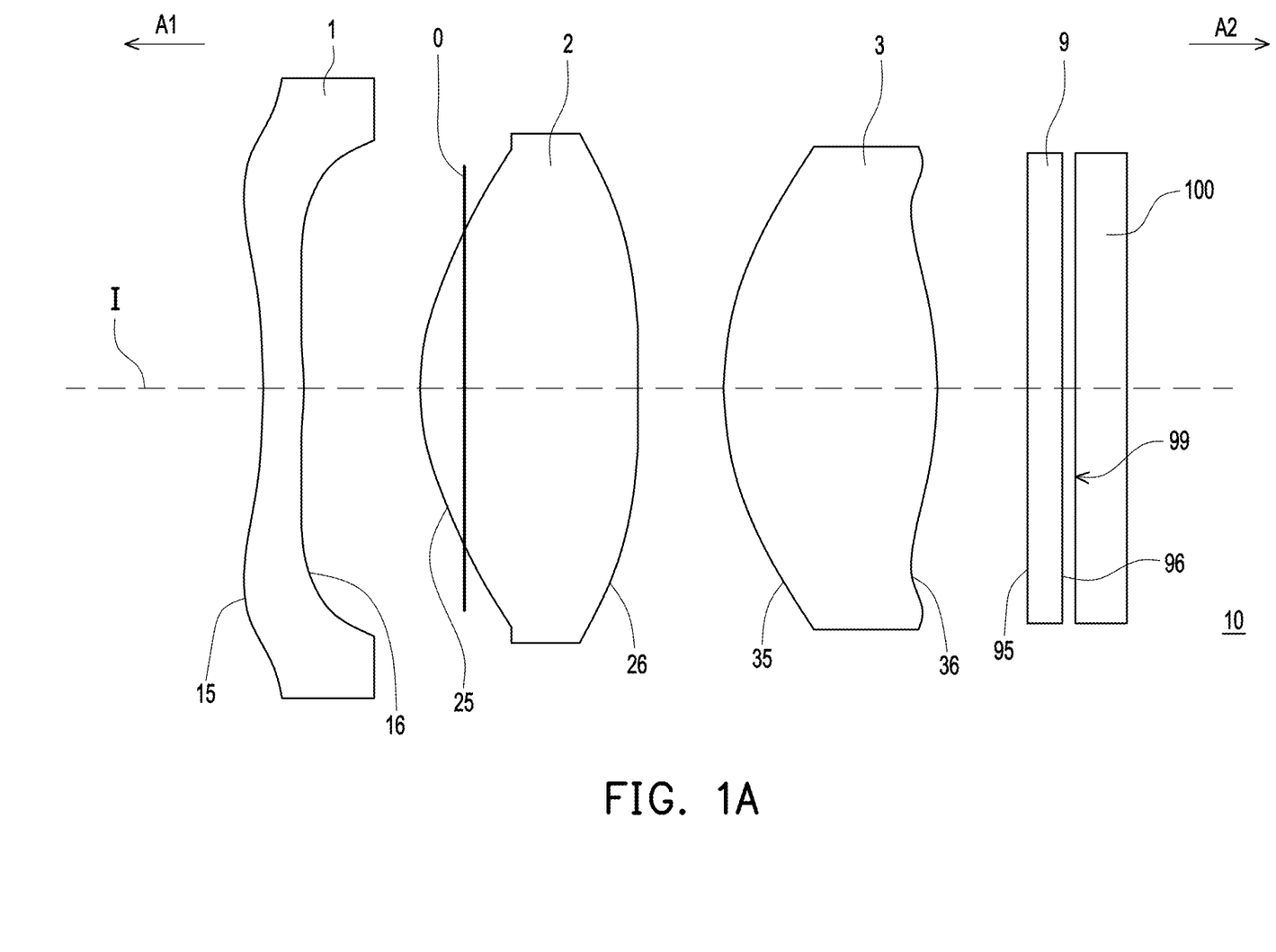
FIG. 1A is a schematic diagram of a variable focus flashlight module according to an embodiment of the disclosure.
Figure 1B:
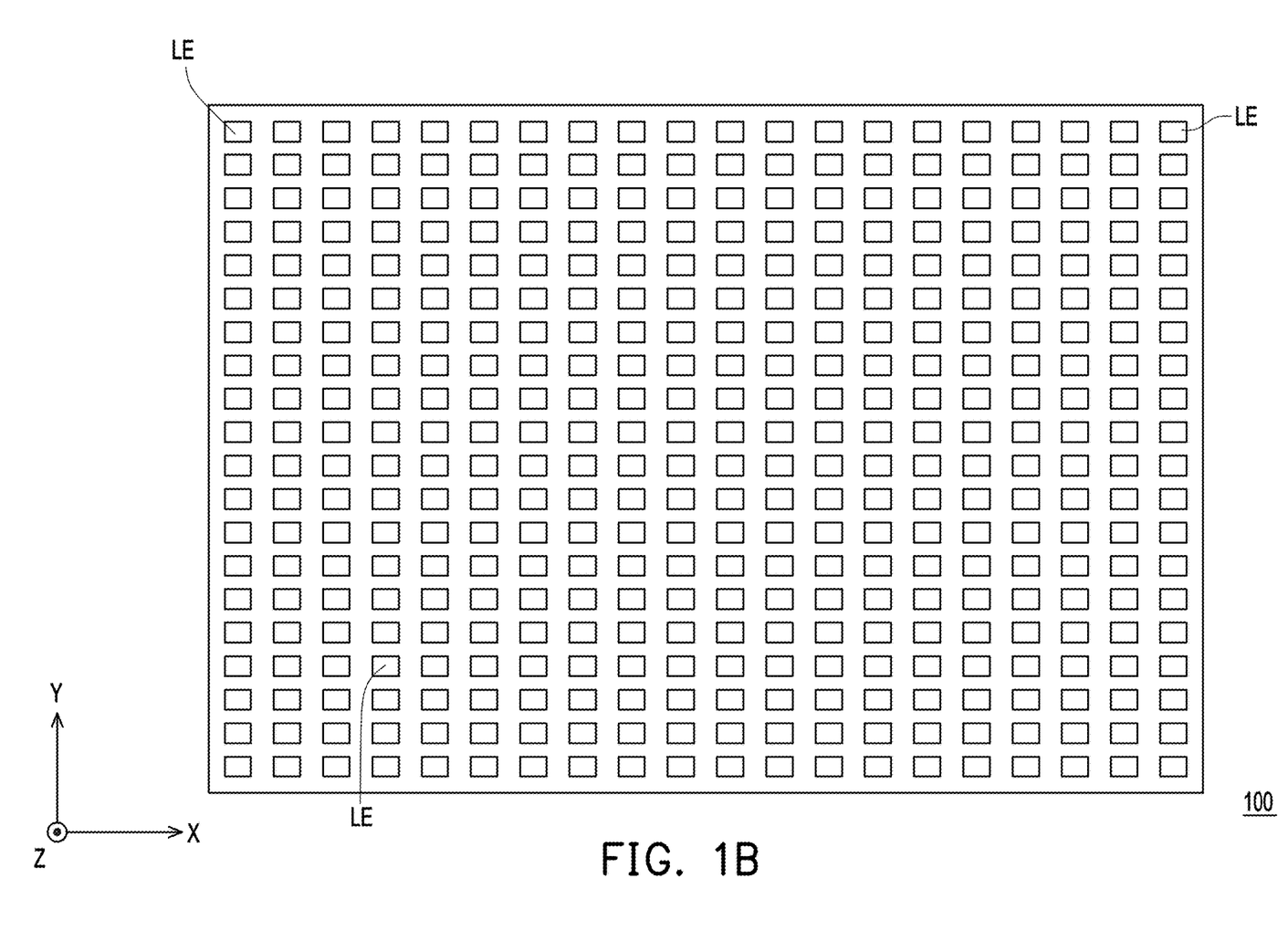
FIG. 1B is a schematic diagram of a light source module of FIG. 1A.
Figure 1C:
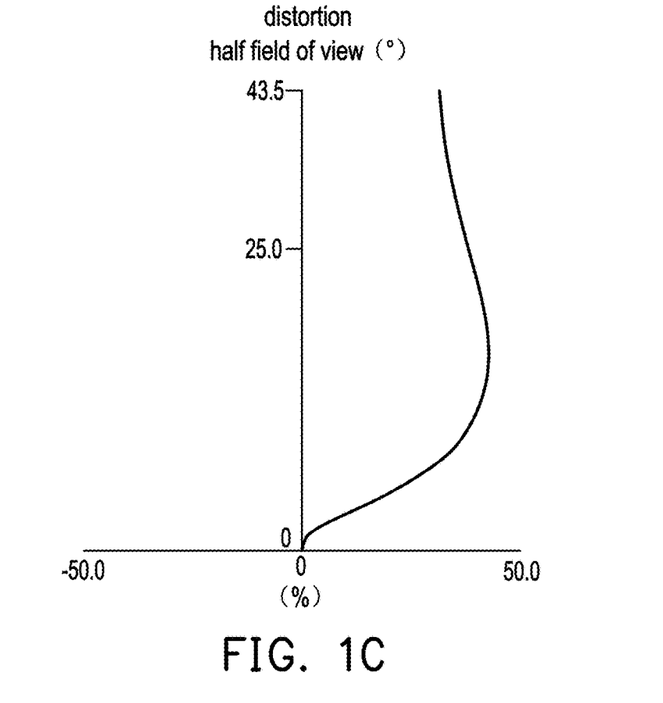
FIGS. 1C and 1D are schematic diagrams of distortion of the variable focus flashlight module of FIG. 1A.
Figure 1D:
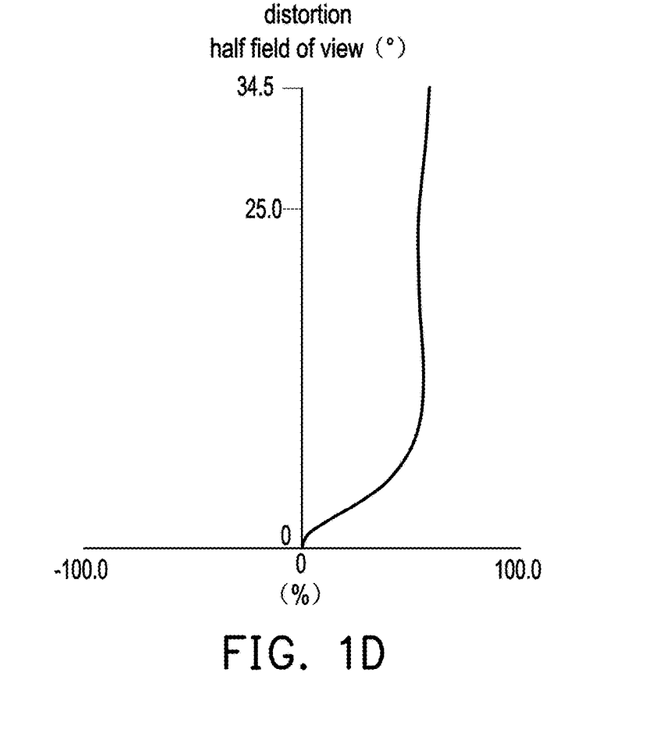
Figure 2A:
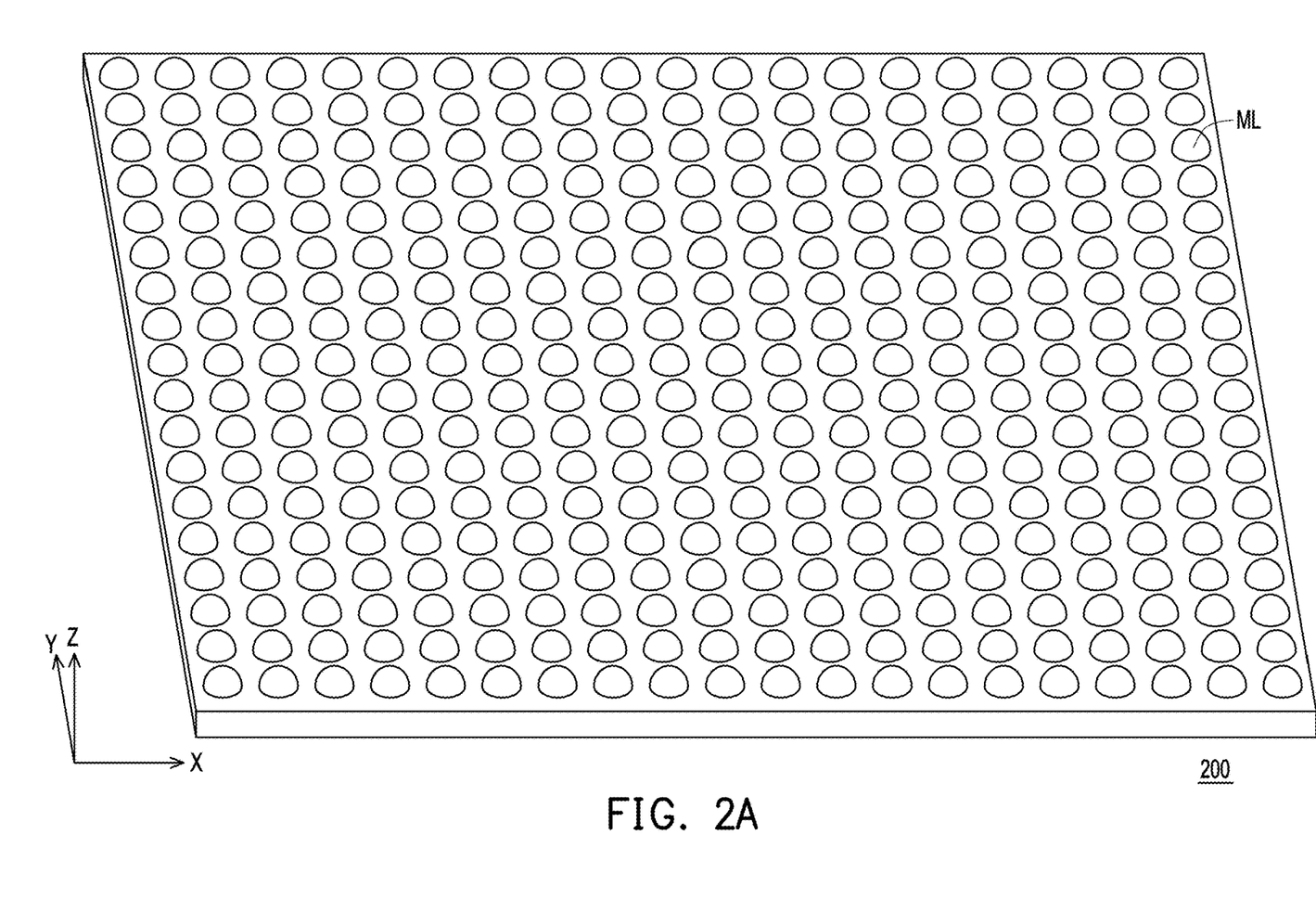
FIG. 2A is a perspective schematic diagram of a micro lens array according to an embodiment of the disclosure.
Figure 2B:
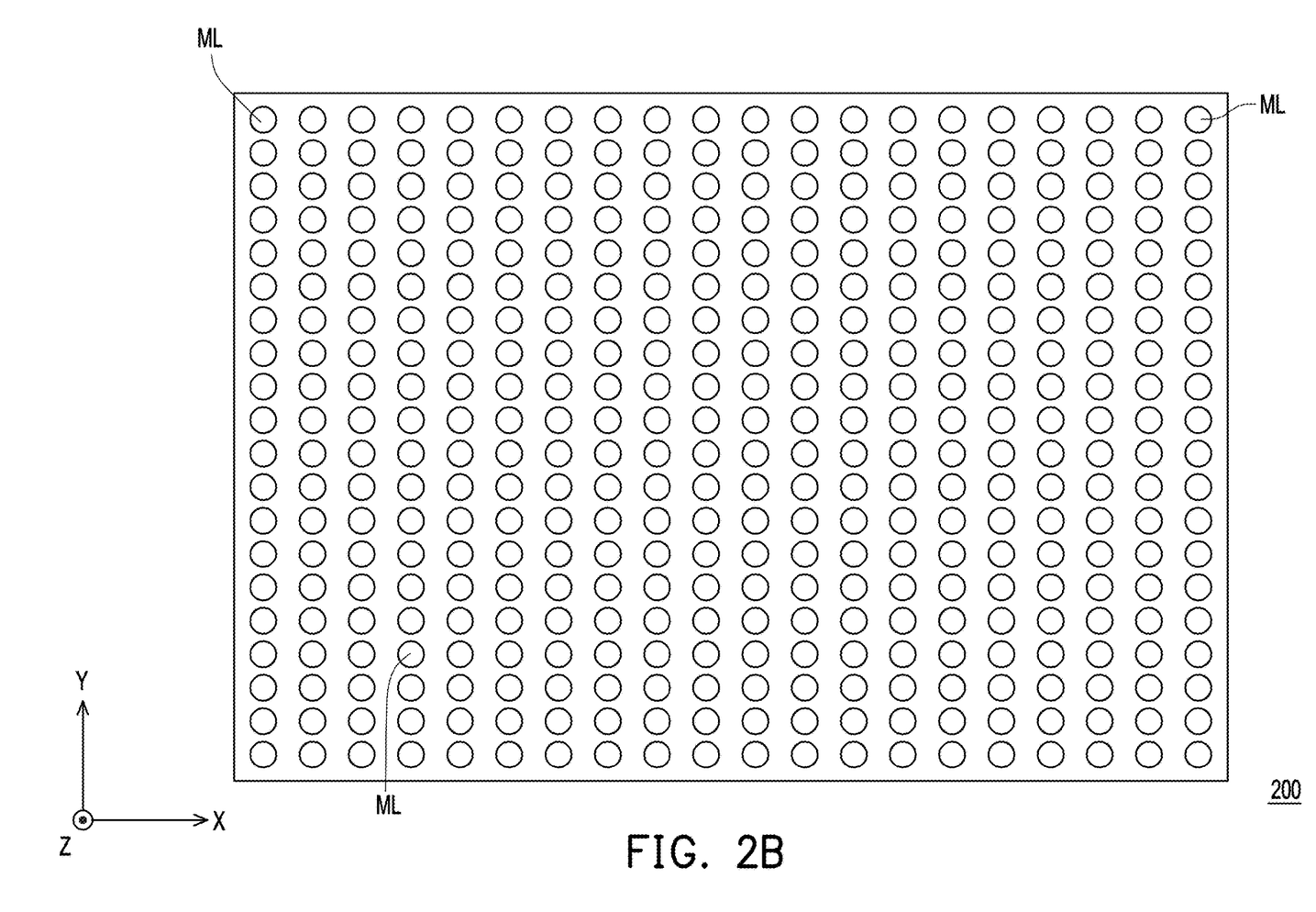
FIG. 2B is a schematic planar diagram of the micro lens array of FIG. 2A.

Referring to FIGS. 1A to 1D, FIG. 1A is a schematic diagram of a variable focus flashlight module according to an embodiment of the disclosure. FIG. 1B is a schematic diagram of a light source module of FIG. 1A. FIGS. 1C and 1D are schematic diagrams of distortion of the variable focus flashlight module of FIG. 1A.

Referring to FIG. 1A, in this embodiment, a variable focus flashlight module 10 includes a first lens 1, an aperture 0, a second lens 2, a third lens 3, a protective cover 9, and a light source module 100 sequentially from a magnified side A1 to a minified side A2 along an optical axis I of the variable focus flashlight module 10.

Referring to FIG. 1B, the light source module 100 includes multiple light emitting elements LE arranged in an array. Each of the light emitting elements LE is a micro light emitting diode or a sub-millimeter light emitting diode, but not limited thereto. Specifically, the light emitting elements LE are disposed on a plane formed by an X direction and a Y direction, and are arranged in an array of M×N on the X-Y plane. Both of M and N are greater than or equal to 20. The X direction, the Y direction, and a Z direction are orthogonal, and the Z direction is parallel to the optical axis I. It should be particularly noted that a light intensity of each of the light emitting elements LE is independently controlled, and the variable focus flashlight module 10 is suitable for providing a pixelated lighting effect.

A light emitted from a light emitting surface 99 of the light source module 100 sequentially passes through the protective cover 9, the third lens 3, the second lens 2, the aperture 0, and the first lens 1, and then provides illumination at the magnified side A1. The protective cover 9 is made of glass and is used to protect the light source module 100. The protective cover 9 is disposed between the third lens 3 and the light source module 100. It is additionally explained that the magnified side A1 is a side facing an object to be illuminated, and the minified side A2 is a side facing the light source module 100.

In this embodiment, each of the first lens 1, the second lens 2, the third lens 3, and the protective cover 9 of the variable focus flashlight module 10 has image-side surfaces 15, 25, 35, and 95 facing the magnified side A1 and allowing the light to pass through, and object-side surfaces 16, 26, 36, and 96 facing the minified side A2 and allowing the light to pass through. The image-side surfaces 15, 25, 35, and 95 are surfaces facing the magnified side A1, and the object-side surfaces 16, 26, 36, and 96 are surfaces facing the minified side A2.

The first lens 1 has a negative refracting power. The image-side surface 15 of the first lens 1 is a concave surface, the object-side surface 16 is a convex surface, and both are even aspheric surfaces. The first lens 1 is a negative meniscus lens having a concave surface facing the magnified side A1.

The second lens 2 has a positive refracting power. The image-side surface 25 of the second lens 2 is a convex surface, the object-side surface 26 is a convex surface, and both are the even aspherical surfaces. The second lens 2 is a biconvex lens.

The third lens 3 has a positive refracting power. The image-side surface 35 of the third lens 3 is a convex surface, the object-side surface 36 is a convex surface, and both are the even aspherical surfaces. The third lens 3 is a biconvex lens.

Other detailed optical data of the present embodiment are shown in Table 1, and an overall effective focal length (EFL) of the variable focus flashlight module 10 is 1.517 mm in an exemplary mode 1, 1.710 mm in an exemplary mode 2, and 1.890 mm in an exemplary mode 3. That is, the effective focal length of the variable focus flashlight module 10 in the mode 1, the mode 2, and the mode 3 gradually increases.

value. In addition, a ratio of a focal length of the second lens 2 to a focal length of the third lens 3 falls within a range of 1.78 to 3.02.

Referring again to FIG. 1A, a total of six surfaces of the image-side surfaces 15, 25, 35 and the object-side surfaces 16, 26, 36 of the first lens 1, the second lens 2, and the third lens 3 are the even aspheric surfaces. The aspheric surfaces are defined according to the following formula (1):

$$Z(Y) = \frac{Y^2}{R} \left/ \left(1 + \sqrt{1-(1+K)\frac{Y^2}{R^2}}\right) \right. + \sum_{i=1}^{n} a_{2i} \times Y^{2i} \quad (1)$$

Y: the distance between the point on the aspheric curve and the optical axis;

TABLE 1

| element | surface | radius of curvature (mm) | spacing (mm) mode 1 | spacing (mm) mode 2 | spacing (mm) mode 3 | refractive index | focal length (mm) |
|---|---|---|---|---|---|---|---|
| object to be illuminated | | infinity | 1.20E+03 | 2.20E+03 | 5.00E+03 | | |
| first lens 1 | image-side surface 15 | −4.298 | 0.250 | 0.250 | 0.250 | 1.54 | −6.812 |
| | object-side surface 16 | −52.055 | 1.246 | 0.868 | 0.751 | | |
| aperture 0 | | infinity | −0.316 | −0.316 | −0.316 | | |
| second lens 2 | image-side surface 25 | 1.924 | 1.632 | 1.632 | 1.632 | 1.54 | 3.321 |
| | object-side surface 26 | −16.976 | 0.640 | 1.038 | 1.478 | | |
| third lens 3 | image-side surface 35 | 1.069 | 1.599 | 1.599 | 1.599 | 1.54 | 1.71 |
| | object-side surface 36 | −3.095 | 0.681 | 0.659 | 0.339 | | |
| protective cover 9 | image-side surface 95 | infinity | 0.250 | 0.250 | 0.250 | 1.52 | |
| | object-side surface 96 | infinity | 0.002 | 0.002 | 0.002 | | |
| | light emitting surface 99 | infinity | | | | | |

In Table 1, a spacing of the image-side surface 15 in the mode 1 (0.250 mm as shown in Table 1) is a thickness of the first lens 1 on the optical axis I. A spacing of the object-side surface 16 in the mode 1 (1.246 mm as shown in Table 1) is the distance between the object-side surface 16 of the first lens 1 and the image-side surface 25 of the second lens 2 on the optical axis I in the mode 1. That is, the gap between the first lens 1 and the second lens 2 on the optical axis I, and so on.

As shown in Table 1, in the mode 1, the mode 2, and the mode 3, the distance between the image-side surface 15 and the light emitting surface 99 on the optical axis I is a constant. In other words, a total length of the variable focus flashlight module 10 provided in this embodiment is a constant value in the mode 1, the mode 2, and the mode 3. More specifically, the total length of the variable focus flashlight module 10 provided in this embodiment is a fixed Z: the aspheric depth, that is, the vertical distance between a point on the aspheric surface that is Y from the optical axis and a tangent plane tangent to the vertex on the optical axis of the aspheric surface;

R: the radius of curvature of the lens surface;

K: the cone coefficient;

$a_{2i}$: the 2ith order aspheric coefficient.

The various aspheric coefficients in the formula (1) from the image-side surface 15 of the first lens 1 to the object-side surface 36 of the third lens 3 are shown in Table 2. The cone coefficients K of the surfaces are all 0. The number 15 in Table 2 indicates the aspheric coefficient of the image-side surface 15 of the first lens 1, and the other numbers may be deduced by analogy.

TABLE 2

| surface | $a_2$ | $a_4$ | $a_6$ | $a_8$ | $a_{10}$ |
|---|---|---|---|---|---|
| 15 | 0.00E+00 | 0.026029432 | −0.000153368 | 0.000119224 | −5.28E−05 |
| 16 | 0.22562895 | −2.23775 | 15.025464 | −27.829345 | 21.38682 |
| 25 | 0.00E+00 | −1.5037354 | 1.3374347 | 1.3854913 | −3.3597469 |
| 26 | 0.00E+00 | −0.93949179 | 2.1614871 | −3.4675455 | 3.1364796 |
| 35 | 0.00E+00 | 2.9681387 | −9.2411049 | 16.133189 | −12.337666 |
| 36 | 0.00E+00 | 0.029834051 | 0.006267064 | −0.000562343 | 0.000271961 |

| surface | $a_{12}$ | $a_{14}$ | $a_{16}$ | $a_{18}$ | $a_{20}$ |
|---|---|---|---|---|---|
| 15 | 1.36E−05 | −1.33E−06 | −2.47E−08 | 0.00E+00 | 0.00E+00 |
| 16 | −21.380492 | 98.587139 | −343.69089 | 1085.261 | −1155.6647 |
| 25 | −5.5332348 | 11.461348 | 10.800092 | −29.856645 | 14.647356 |
| 26 | −1.2847425 | 0.031487339 | 0.09773227 | −0.002378944 | 0.015183891 |
| 35 | −2.4997715 | 9.6508635 | −4.1791979 | −0.086423459 | 0.001666024 |
| 36 | −0.000162621 | 9.32E−07 | 2.79E−06 | 0.00E+00 | 0.00E+00 |

Referring to FIGS. 1C and 1D, FIG. 1C is a schematic diagram of distortion of the variable focus flashlight module 10 for visible light in the mode 1. FIG. 1D is a schematic diagram of distortion of the variable focus flashlight module 10 for visible light in the mode 3. The mode 1 may be regarded as a short-focus mode (a wide-angle mode) of the variable focus flashlight module 10, and a full field angle thereof is 87 degrees. The mode 3 may be regarded as a long-focus mode (a telephoto mode) of the variable focus flashlight module 10, and the full field angle thereof is 69 degrees.

The distortion aberration diagram of FIG. 1C shows that the distortion aberration of the variable focus flashlight module 10 in the short-focus mode is maintained within a range of ±45%. The distortion aberration diagram of FIG. 1D shows that the distortion aberration of the variable focus flashlight module 10 in the long-focus mode is maintained within a range of ±60%.

In general, the variable focus flashlight module 10 utilizes the lenses to achieve the function of adjustable illumination range. It may be seen from FIG. 1C and FIG. 1D that the variable focus flashlight module 10 has proper illumination quality in different illumination ranges.

In some embodiments, the first lens 1, the second lens 2, and the third lens 3 may be replaced by Fresnel lenses to reduce the volume of the variable focus flashlight module 10.

Referring to FIGS. 1A, 1B, 2A, and 2B, in some embodiments, the variable focus flashlight module 10 may further include a micro lens array 200, which is disposed between the third lens 3 and the light source module 100 (for example, between the third lens 3 and the protective cover 9 in FIG. 1A). Each of the light emitting element LE corresponds to micro lenses ML of K, where K is a positive integer greater than or equal to 1.

Figure 3A:
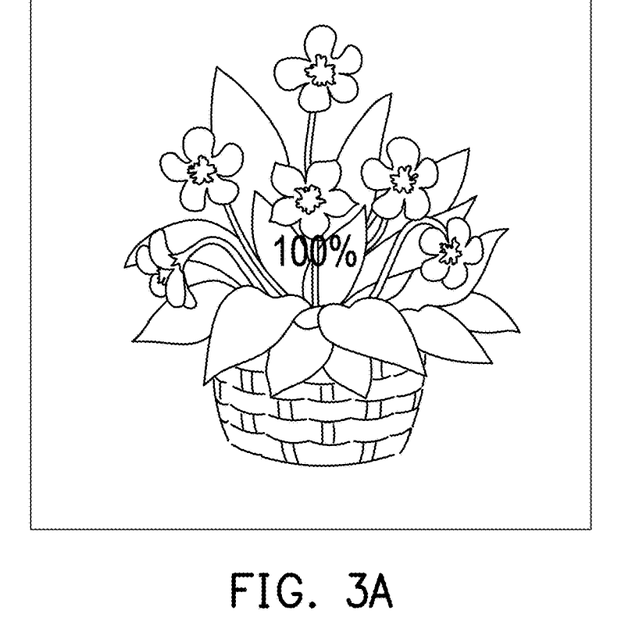
FIG. 3A is a schematic diagram of illumination of a flashlight module according to a comparative example.
Figure 3B:
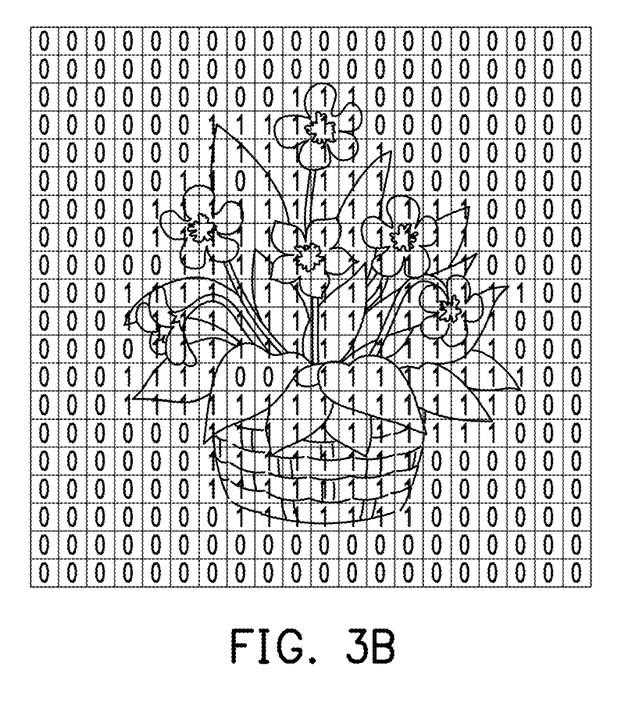
FIG. 3B is a schematic diagram of illumination of a variable focus flashlight module according to an embodiment of the disclosure.

Referring to FIGS. 3A and 3B, FIG. 3A is a schematic diagram of illumination of a flashlight module according to a comparative example. FIG. 3B is a schematic diagram of illumination of a variable focus flashlight module according to an embodiment of the disclosure. The variable focus flashlight module 10 provided in the embodiment of the disclosure utilizes the light emitting elements LE that is discrete and whose light-emitting intensities may be independently controlled to generate an illumination light in an array, so that an illumination area is "arrayed", and relative illumination intensities of different illumination areas may be configured to be the same or different (as shown in FIG. 3B), rather than being limited to a single illumination intensity (marked as 100%) as shown in FIG. 3A. Specifically, as shown in FIG. 3B, the illumination intensity of the illumination area corresponding to the object to be illuminated may be higher (marked as "1"), and the illumination intensity of the illumination area not corresponding to the object to be illuminated may be lower (marked as "0"). However, the disclosure is not limited thereto. The relative illumination intensity of each of the illumination area may be flexibly adjusted according to needs.

In summary, the variable focus flashlight module provided in the embodiment of the disclosure utilizes the light emitting elements to generate arrayed illumination areas. The relative illumination intensity and a color temperature of different illumination areas are adjustable. In addition, the lenses are used to achieve the function of adjustable illumination range.

What is claimed is:

1. A variable focus flashlight module, sequentially from a magnified side to a minified side along an optical axis of the variable focus flashlight module, comprising:
    a first lens, having a negative refracting power, wherein the first lens is a negative meniscus lens with a concave surface facing the magnified side;
    a second lens, having a positive refracting power, wherein the second lens is a biconvex lens;
    a third lens, having a positive refracting power, wherein the third lens is a biconvex lens; and
    a light source module, comprising a plurality of light emitting elements arranged in an array;
    wherein a total length of the variable focus flashlight module is a constant, and a ratio of a focal length of the second lens to a focal length of the third lens falls within a range of 1.78 to 3.02, both of an object-side surface and an image-side surface of the first lens, the second lens and the third lens are even aspherical surfaces.

2. The variable focus flashlight module according to claim 1, wherein the plurality of light emitting elements are micro light emitting diodes or sub-millimeter light emitting diodes.

3. The variable focus flashlight module according to claim 2, wherein the plurality of light emitting elements arranged in an array are the light emitting elements of M×N, wherein M and N are both greater than or equal to 20.

4. The variable focus flashlight module according to claim 3, further comprising a micro lens array disposed between the third lens and the light source module, wherein each of the plurality of light emitting elements corresponds to the micro lenses of K, and K is a positive integer greater than or equal to 1.

5. The variable focus flashlight module according to claim 2, wherein each of the plurality of light emitting elements is independently controlled to emit light, and the variable focus flashlight module is suitable for providing a pixelated lighting effect.

\* \* \* \* \*